(12) United States Patent
Liang

(10) Patent No.: US 8,436,838 B2
(45) Date of Patent: May 7, 2013

(54) TOUCH PEN

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 493 days.

(21) Appl. No.: 12/764,196

(22) Filed: Apr. 21, 2010

(65) Prior Publication Data
US 2011/0094804 A1 Apr. 28, 2011

(30) Foreign Application Priority Data
Oct. 28, 2009 (CN) .......................... 2009 1 0308992

(51) Int. Cl.
*G06F 3/033* (2006.01)

(52) U.S. Cl.
USPC ...................... 345/179; 178/18.01; 178/19.01; 401/117

(58) Field of Classification Search .................. 401/117
See application file for complete search history.

(56) References Cited

U.S. PATENT DOCUMENTS

| | | | | |
|---|---|---|---|---|
| 300,709 A * | 6/1884 | Huntoon | ........................ | 401/52 |
| 1,807,444 A * | 5/1931 | Shatkin | ........................ | 401/95 |
| 5,850,059 A * | 12/1998 | Yoshimura | ................ | 178/19.01 |
| 5,889,512 A * | 3/1999 | Moller et al. | ................ | 345/179 |
| 6,752,557 B1 * | 6/2004 | Hsieh | ........................ | 401/117 |
| 6,921,225 B1 * | 7/2005 | Hsu | ........................ | 401/117 |
| 7,374,359 B1 * | 5/2008 | Annerino et al. | ............ | 401/258 |
| 7,726,894 B2 * | 6/2010 | Yoon | ........................ | 401/116 |
| 2003/0184529 A1 * | 10/2003 | Chien et al. | .................. | 345/179 |
| 2007/0020037 A1 * | 1/2007 | Liu | ........................ | 401/259 |
| 2008/0170048 A1 * | 7/2008 | Hua | ........................ | 345/179 |
| 2009/0122029 A1 * | 5/2009 | Sin | ........................ | 345/179 |
| 2011/0221710 A1 * | 9/2011 | Liang | ........................ | 345/179 |
| 2011/0221712 A1 * | 9/2011 | Liang | ........................ | 345/179 |

* cited by examiner

*Primary Examiner* — William Boddie
*Assistant Examiner* — Christopher Thompson
(74) *Attorney, Agent, or Firm* — Altis Law Group, Inc.

(57) ABSTRACT

A touch pen includes a bush, a sliding rod, and a pen body. The sleeve has a pen head secured at an end and defines a receiving hole. The sliding rod is fixed in the receiving hole and defines a guiding slit. The pen body has an extending end defining an accommodating hole. The extending end is receivable in the receiving hole and the sliding rod is receivable in the accommodating hole. A holding pin is secured in the accommodating hole and passes through the guiding slit, the pen body slides relative to the pen head, the holding pin slides along the guiding slit and can be hold at the two ends of the guiding slit.

12 Claims, 5 Drawing Sheets

TOUCH PEN

BACKGROUND

1. Technical Field

The present disclosure relates to touch pens, and particularly, to a touch pen used in portable electronic devices.

2. Description of the Related Art

With the development of wireless communication and information processing technologies, portable electronic devices, such as mobile phones and personal digital assistants (PDAs), are now in widespread use.

Touch pens are usually provided and are secured within the outside wall of the portable electronic device for inputting information. The touch pens need to be small or thin for a compact requirement of the portable electronic device, however, they are not comfortable to use.

Therefore, there is room for improvement within the art.

BRIEF DESCRIPTION OF THE DRAWINGS

Many aspects of the present touch pen and the portable electronic device using the same can be better understood with reference to the following drawings. The components in the drawings are not necessarily drawn to scale, the emphasis instead being placed upon clearly illustrating the principles of the present touch pen and a portable electronic device using the same. Moreover, in the drawings, like reference numerals designate corresponding parts throughout the several views.

DETAILED DESCRIPTION

Figure 1:
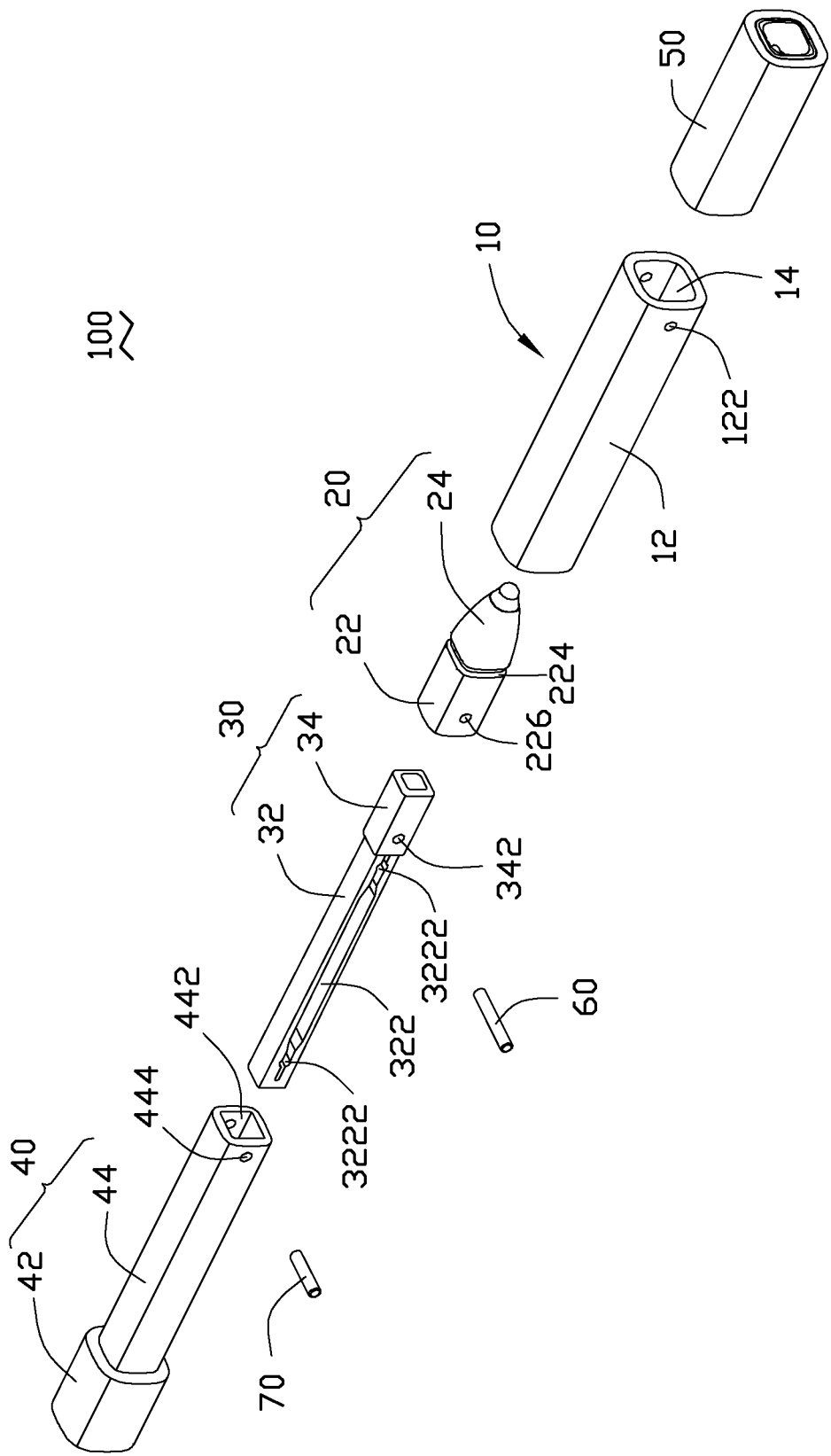
FIG. 1 is an exploded isometric view of an embodiment of a touch pen.
Figure 2:
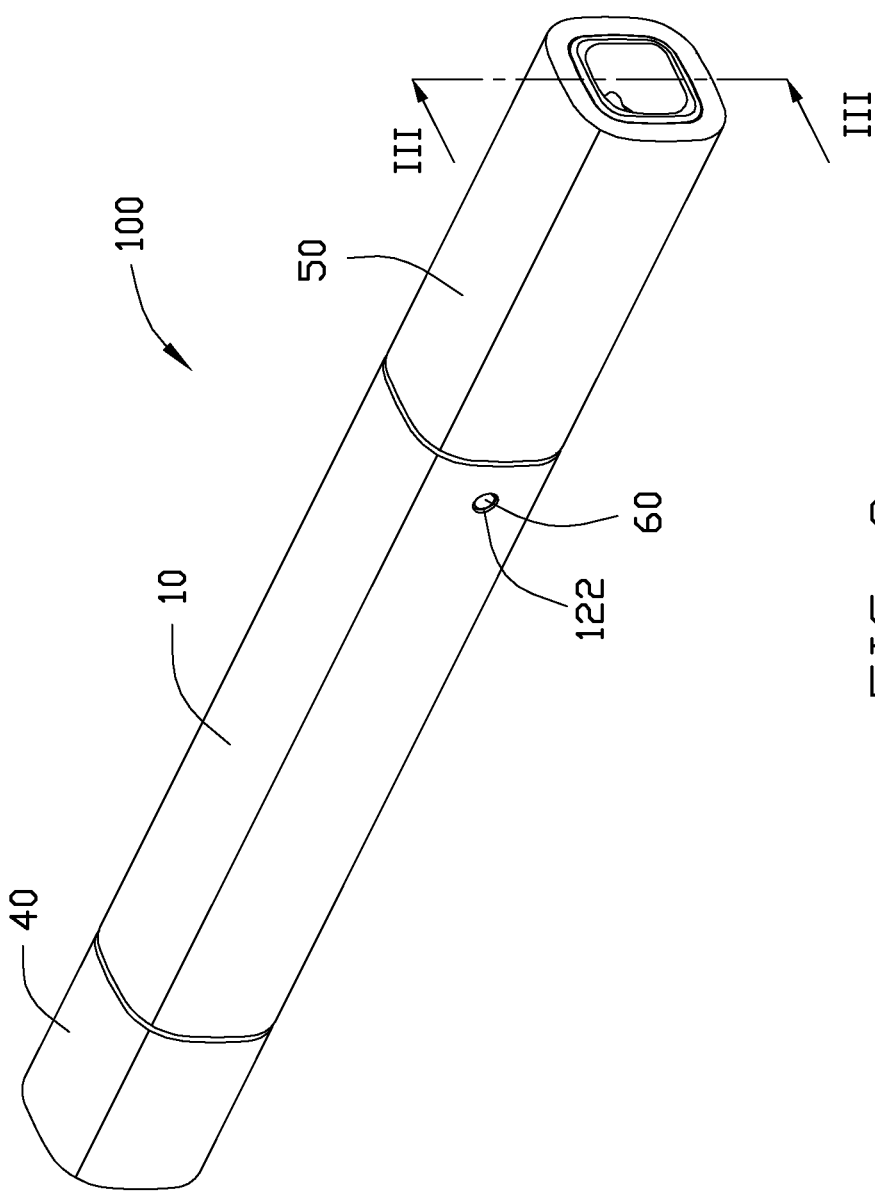
FIG. 2 is an assembled, isometric view of the touch pen shown in FIG. 1.

FIG. 1 shows an exemplary touch pen 100 used in a portable electronic device such as a mobile phone, or a personal digital assistant (PDA). The touch pen 100 includes a sleeve 10, a pen head 20, a sliding rod 30, a pen body 40, and a pen cap 50.

The sleeve 10 has a wall 12 enclosing a receiving through hole 14. The wall 12 may be cylindrical or square/rectangular, etc. The wall 12 defines a fixing hole 122 radially through the wall 12. The fixing hole 122 is located adjacent to an end of the wall 12 to engage a connecting pin 60 to connect the sleeve 10 with the pen head 20.

The pen head 20 includes a connecting portion 22 and a touching portion 24 connecting to an end of the connecting portion 22. The connecting portion 22 connects to the sliding rod 30 and can engage into the receiving hole 14 of the sleeve 10. The connecting portion 22 is hollow and defines an axial chamber 222 to receive an end of the sliding rod 30 (shown in FIG. 3). The connecting portion 22 defines an annular latching recess 224 and a positioning hole 226 at the periphery. The latching recess 224 is located adjacent to the touching portion 24 to latch the pen cap 50. The positioning hole 226 is located at the other end opposite to the touching portion 24 and connects the pen head 20 with the sliding rod 30. The positioning hole 226 radially extends along the connecting portion 22 and passes through the chamber 222. The connecting pin 60 can pass through the fixing hole 122 and the positioning hole 226 to secure the sleeve 10 to the pen head 20. The touching portion 22 is tapered and is used to contact a touch screen of the portable electronic device.

The sliding rod 30 is elongated and can be made of elastic material. The sliding rod 30 includes a main body 32 and an engagement body 34 connecting with the main body 32. The main body 32 defines a guiding slit 322 longitudinally extending along the main body 32. The guiding slit 322 includes two clamping holes 3222 at the two ends. The engagement body 34 can be received in the chamber 222 of the pen head 20 and defines a connecting hole 342 extending radially to engage with the positioning hole 226 of the pen head 20. The connecting pin 60 can pass through the fixing hole 122 of the sleeve 10. The positioning hole 226 of the pen head 20 and the connecting hole 342 of the sliding rod 30 are used to connect the sleeve 10, the pen head 20 and the sliding rod 30.

The pen body 40 includes an end portion 42 and an extending portion 44 laterally protruding from an end of the end portion 42. The extending portion 42 is engagingly received in the receiving hole 14 of the sleeve 10. The extending portion 44 defines an accommodating hole 442 at the end surface opposite to the end portion 42. The accommodating hole 442 extends longitudinally along the extending portion 44 to receive the main body 32 of the sliding rod 30. The extending portion 44 defines a holding hole 444 adjacent to an end opposite to the end portion 42. The holding hole 444 holds a holding pin 70. The holding pin 70 passes through the guiding slit 322 of the sliding rod 30 and can be clamped into the clamping holes 3222.

The pen cap 50 is engageable with the pen head 20 and defines an engaging cavity 52 at an end to receive the touching portion 24 therein. (shown in FIG. 3), accordingly, a peripheral wall 522 is formed. The pen cap 50 forms a circle latching flange 524 at the inner side of the peripheral wall 522, and the latching flange 524 can engage into the latching recess 224 of the pen head 20.

Figure 3:
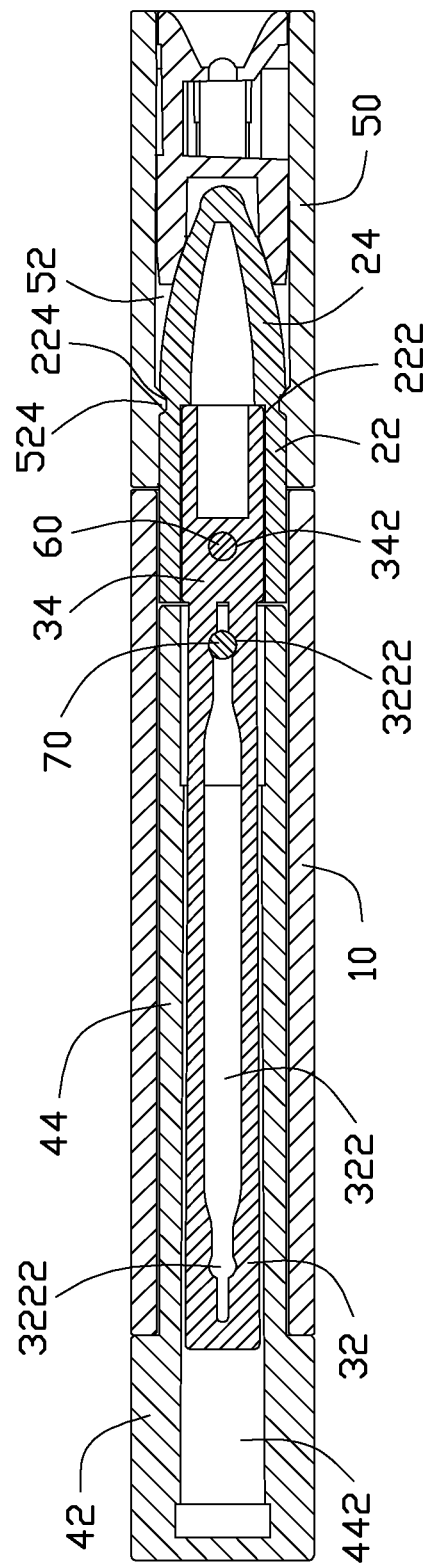
FIG. 3 is a cut-away view of FIG. 2.
Figure 4:
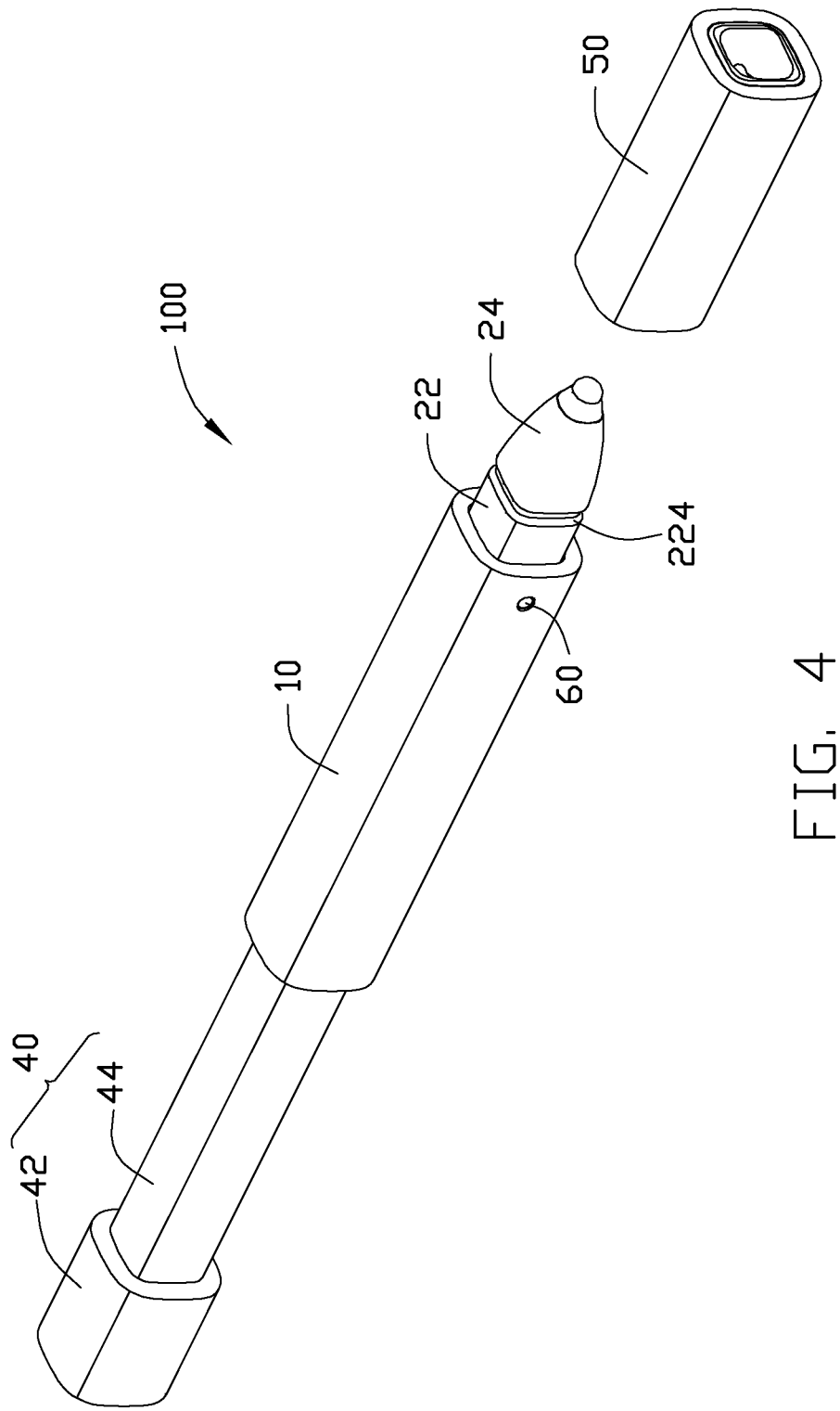
FIG. 4 is an isometric view of the touch pen shown in FIG. 2, when the touch pen is stretched.

Referring to FIGS. 3 and 4, during assembly of the touch pen 10, the main body 32 of the sliding rod 30 is inserted into the accommodating hole 442 exposing a portion of the engagement body 34. The holding pin 70 is secured to the holding hole 444 with the holding pin 70 passing through the guiding slit 322 and being clamped in a clamping hole 322. Then, the engagement body 34 of the sliding rod 30 is inserted into the chamber 222 of the pen head 20, and the pen head 20 resists against and aligns with the extending portion 44. Then, the sleeve 10 surrounds the pen head 20 and the extending portion 44 of the pen body 40. The touching portion 24 is exposed out of the receiving hole 14 of the sleeve 10. Meanwhile the connecting hole 342 of the sliding rod 30, the positioning hole 226 of the pen head 20 and the fixing hole 122 of the sleeve 10 are aligned with each other. The connecting pin 60 is positioned and passes through the fixing hole 122, the positioning hole 226 and the connecting hole 342. Accordingly, the sleeve 10, the pen head 20 and the sliding rod 30 are secured as a unit. The pen cap 50 covers the touching portion 24 with the latching flange 524 latching into the latching recess 224 of the pen head 20. Therefore, the assembly of the touching pen 100 is finished.

Figure 5:
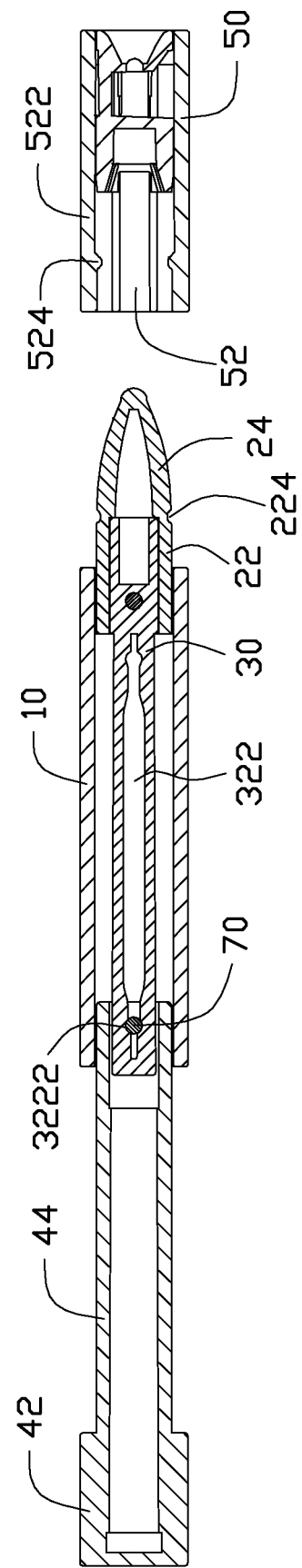
FIG. 5 is a cut-away view of the touch pen shown in FIG. 4.

Referring to FIGS. 4 and 5, in use of the touching pen 100, the pen cap 50 is opened by detaching it from the touching portion 24 of the pen head 20. The end portion 42 of the pen body 40 is pulled away from the sleeve 10. Therefore, the pen body 40 slides and the holding pin 70 moves out of the clamping hole 3222 and slides along the guiding slit 322 until the holding pin 70 slides into the other clamping hole 3222. At this time, the holding pin 70 is clamped in the clamping hole 3222 and the pen body 40 is steadily secured relative to the pen head 20. In this case, the touching pen 100 can be used with the extended length for convenience.

It should be pointed out that the sleeve 10 and the pen head 20 can be integrally formed as a whole.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A touch pen, comprising:
a sleeve having a pen head secured at an end and defining a receiving hole;
a sliding rod fixed in the receiving hole and defining a guiding slit;
a pen body having an extending end, the extending end defining an accommodating hole, the extending end being a hollow frame including two opposite walls, each wall defines a holding hole communicating with the accommodating hole;
wherein the extending end is receivable in the receiving hole and the sliding rod is receivable in the accommodating hole, a holding pin passes through the holding hole, the accommodating hole, and the guiding slit in turn, and is secured in the holding hole, the accommodating hole, and the guiding slit, for inseparably connecting the pen body to the sliding rod, the pen body slides relative to the pen head, the holding pin slides within the guiding slit and can be held at the two ends of the guiding slit.

2. The touch pen of claim 1, wherein the guiding slit includes two clamping holes at the two ends to clamp the holding pin.

3. The touch pen of claim 1, wherein the sleeve defines a fixing hole, the pen head defines a positioning hole and the sliding rod defines a connecting hole, a connecting pin passes through the fixing hole, the positioning hole and the connecting hole to secure the sleeve, the pen head and the sliding rod.

4. The touch pen of claim 1, wherein the pen head includes a connecting portion engagable into the receiving hole, the connecting portion defines a chamber to receive the sliding rod.

5. The touch pen of claim 4, wherein the pen head includes a touching portion connecting to an end of the connecting portion, the touching portion is tapered.

6. The touch pen of claim 5, wherein the touch pen includes a pen cap, the pen cap defines an engaging cavity to receive the touching portion, the pen cap forms a latching flange at the inner side, the connecting portion defines a latching recess to engage with the latching flange.

7. The touch pen of claim 4, wherein the sliding rod includes a main body and an engagement body connecting to the main body, the main body defines the guiding slit, the engagement body engages into the chamber.

8. The touch pen of claim 1, wherein pen body includes an end portion and the extending portion protruding from the end portion, the extending portion is received in the receiving hole and the end portion resists with the sleeve.

9. A touch pen, comprising:
a sleeve having a pen head formed at an end and defining a receiving hole;
a sliding rod fixed in the receiving hole and defining a guiding slit;
a pen body having an extending end defining an accommodating hole, the extending end being a hollow frame including two opposite walls, each wall defines a holding hole communicating with the accommodating hole;
wherein the extending end is receivable in the receiving hole and the sliding rod is receivable in the accommodating hole, a holding pin passes through the holding hole, the accommodating hole, and the guiding slit in turn, and is secured in the holding hole, the accommodating hole, and the guiding slit, for inseparably connecting the pen body to the sliding rod, the pen body slides relative to the pen head, the holding pin slides within the guiding slit and can be held at the two ends of the guiding slit.

10. The touch pen of claim 9, wherein the guiding slit includes two clamping holes at the two ends to clamp the holding pin.

11. The touch pen of claim 9, wherein the touch pen includes a pen cap, the pen cap defines an engaging cavity to receive the pen head, the pen cap forms a latching flange, the pen head defines a latching recess to engage with the latching flange.

12. The touch pen of claim 9, wherein pen body includes an end portion and the extending portion protruding from the end portion, the extending portion is received in the receiving hole and the end portion resists with the sleeve.

\* \* \* \* \*